United States Patent [19]

Ikeda et al.

[11] Patent Number: 4,910,703
[45] Date of Patent: Mar. 20, 1990

[54] DATA PROCESSING UNIT HAVING MULTIPLE-PURPOSE PORT USED AS A RESONATOR CONNECTION PORT IN FIRST MODE AND AS A DATA I/O PORT IN SECOND MODE

[75] Inventors: Yukihiro Ikeda; Toshiyuki Kumagai, both of Tokyo, Japan

[73] Assignee: NEC Corporation, Tokyo, Japan

[21] Appl. No.: 223,581

[22] Filed: Jul. 25, 1988

[30] Foreign Application Priority Data

Jul. 27, 1987 [JP]  Japan .............................. 62-188165

[51] Int. Cl.⁴ ............................................. G06F 3/00
[52] U.S. Cl. .......................... 364/900; 307/269; 307/465; 364/934; 364/948.1; 364/254.8; 364/270
[58] Field of Search .............. 364/200, 900; 307/269, 307/441, 465

[56] References Cited

U.S. PATENT DOCUMENTS

| | | | |
|---|---|---|---|
| 4,349,870 | 9/1982 | Shaw et al. | 364/200 |
| 4,672,299 | 6/1987 | Grimes et al. | 307/269 |
| 4,691,126 | 9/1987 | Splett et al. | 307/441 |
| 4,691,342 | 9/1987 | Waldron et al. | 364/900 |
| 4,725,835 | 2/1988 | Schreiner et al. | 307/465 |
| 4,779,008 | 10/1988 | Kessels | 307/269 |

Primary Examiner—Gareth D. Shaw
Assistant Examiner—Gopal C. Ray
Attorney, Agent, or Firm—Sughrue, Mion, Zinn, Macpeak & Seas

[57] ABSTRACT

For allowing a port to serve as not only one of the system clock input port but also a data input/output port, there is disclosed a data processing unit comprising a system clock supplying circuit operative in an internal oscillation mode or a transmission mode depending upon a mode selecting signal, a shifting circuit operative to provide an electrical path between two ports and the system clock supplying circuit in the internal oscillation mode but to provide another electrical path between one of the two ports and a data input/output line in the transmission mode, so that one of the ports serves between the clock input port and the data input/output port depending upon the mode selecting signal.

10 Claims, 4 Drawing Sheets

PRIOR-ART

DATA PROCESSING UNIT HAVING MULTIPLE-PURPOSE PORT USED AS A RESONATOR CONNECTION PORT IN FIRST MODE AND AS A DATA I/O PORT IN SECOND MODE

FIELD OF THE INVENTION

This invention relates to a data processing unit such as a microprocessor or a microcomputer and, more particularly, to a system clock supplying circuit operable in two different modes.

BACKGROUND OF THE INVENTION

A typical example of the system clock supplier incorporated in a microprocessor 1 is illustrated in FIG. 1. The system clock supplier is operable in two different modes, i.e., an internal oscillation mode of operation and a transmission mode of operation. The system clock supplier is accompanied by two input terminals 2 and 3 which are coupled to an external crystal resonator 4. The external crystal resonator 4 is replacable with a ceramic resonator. The system clock supplier comprises a first amplifier circuit 5, a resistor 6 and a second amplifier circuit 7 used for waveshape, and the first amplifier circuit 5 and the resistor 6 form in combination a feedback loop. When the system clock supplier operates in the internal oscillation mode, the feedback loop produces a raw system clock in association with the crystal resonator 4. The raw system clock is shaped by the second amplifier circuit 7 to produce a system clock which is supplied to a system clock line 8. On the other hand, when the system clock supplier is changed from the internal oscillation mode of operation to the transmission mode of operation, an external small clock is supplied to the input terminal 2 and, then, amplified and shaped by the first and second amplifier circuits 5 and 7 to produce a system clock. Thus, if the system clock supplier operates in the transmission mode, the input terminal 3 lies idle. In general, a packaging restricts the microprocessor to have a relatively small number of the terminals, and a new function usually demand additional terminals. Then, an idle terminal such as input terminal 3 is not desirable for the microprocessor.

SUMMARY OF THE INVENTION

It is therefore an important object of the present invention to provide a system clock supplier which has a wide application.

In accordance with the present invention, there is provided a data processing provided with at least two ports and fabricated on a single semiconductor chip, the data processing unit being capable of operation in association with a clock source producing a clock signal, comprising, the two ports being coupled to an external resonance element producing a small periodical signal: (a) a system clock supplying circuit having two input nodes coupled to the two ports and an output node coupled to a system clock line, the system clock supplying circuit being operative in one of an internal oscillation mode and a transmission mode; (b) a data signal propagation line; (c) a port controlling circuit responsive to a mode selecting signal and operative to produce a mode control signal representative of the internal oscillation mode or the transmission mode; and (d) a shifting circuit responsive to the mode control signal and operative to allow the system clock supplying circuit to produce a system clock in association with the two ports supplied with the small periodical signal in the presence of the mode control signal representative of the internal oscillation mode, the shifting circuit further being operative to allow the system clock supplying circuit to transmit the clock signal appearing at one of the ports to the system clock line in the presence of the mode control signal representative of the transmission mode, the shifting circuit further being operative to provide an electrical path between the data signal propagation line and the other of the two ports in the presence of the mode control signal representative of the transmission mode.

BRIEF DESCRIPTION OF THE DRAWINGS

The features and advantages of a system clock supplier according to the present invention will be more clearly understood from the following description taken in conjunction with the accompanying drawings in which.

DESCRIPTION OF THE PREFERRED EMBODIMENTS

First Embodiment

Figure 1:
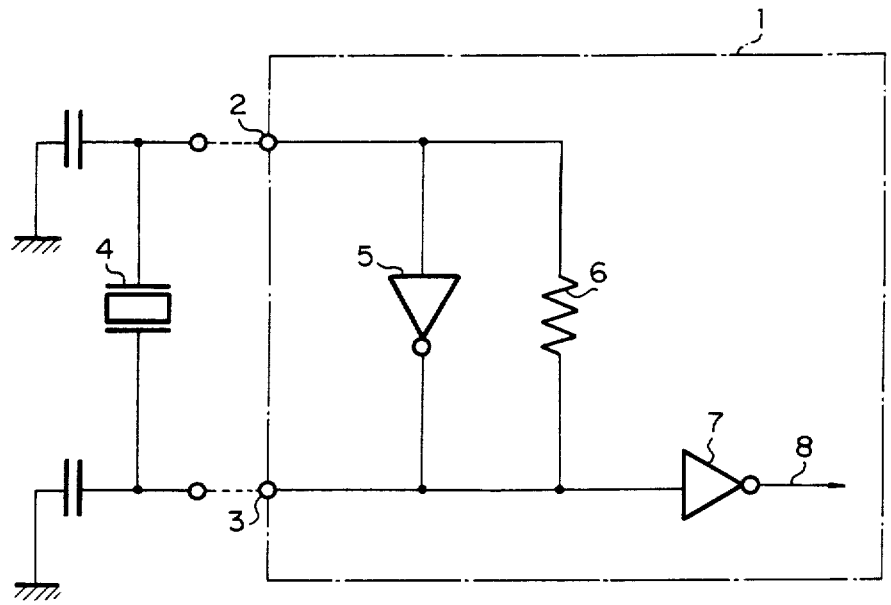
FIG. 1 is a diagram showing the circuit arrangement of a prior-art system clock supplier.
Figure 2:
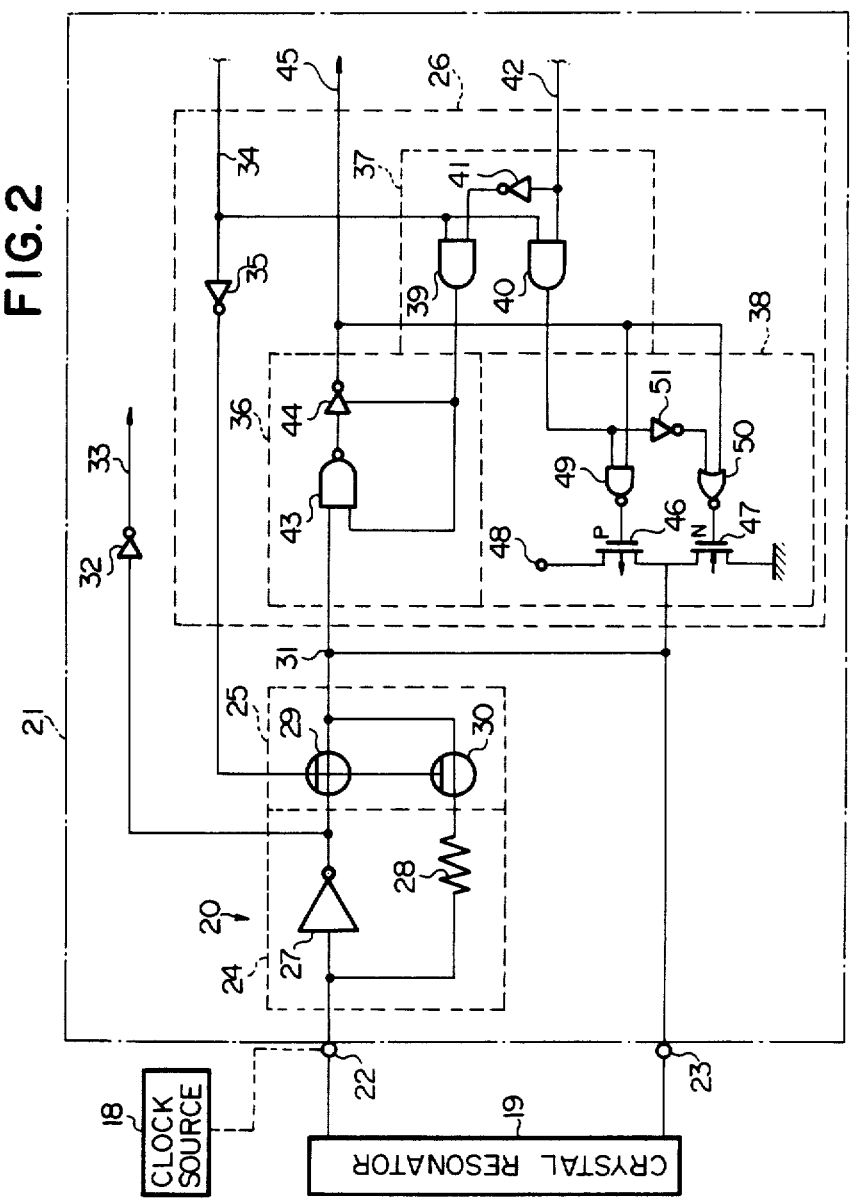
FIG. 2 is a diagram showing the circuit arrangement of a microprocessor embodying the present invention.

Referring to FIG. 2 of the drawings, there is illustrated a system clock supplying circuit incorporated in a microprocessor 21 fabricated on a single semiconductor chip. The microprocessor 21 has a complicate circuit arrangement for data processing and a plurality of ports including two ports 22 and 23, however FIG. 2 merely shows a system clock supplying circuit 20 with a feedback loop 24, a shifting circuit 25 and a port controlling circuit 26 to which the present invention mainly appertains. The ports 22 and 23 are coupled to a crystal resonator 19 or a ceramic resonator. The port 22 is further capable of coupling to a clock source 18.

The feedback loop 24 is provided with an amplifier circuit 27 and a resistor 28 arranged in parallel, and the amplifier circuit 27 and the resistor 28 have respective input nodes coupled to the pot 22. The shifting circuit 25 has two transmission gates 29 and 30 provided in parallel to each other, and the transmission gates 29 and 30 are coupled at one ends thereof to respective output nodes of the amplifier circuit 27 and the resistor 28, respectively. Each of the transmission gates 29 and 30 is provided with an n-channel type field effect transistor and a p-channel type field effect transistor coupled in parallel. However, the transmission gates 29 and 30 are coupled a the other ends thereof to an output node 31 of the shifting circuit 25, and the output node 31 of the shifting circuit 25 is coupled to the port 23. The output node of the feedback loop 24 is coupled to the inverter circuit 32 used for waveshape which in turn is coupled to a system clock line 33. The inverter circuit forms part of the system clock supplying circuit 20. The shifting circuit 25 is associated with a mode signal line 34 where a mode selecting signal appears, and the mode signal line 34 is coupled to an inverter circuit 35 which in turn is coupled to the transmission gates 29 and 30.

The port controlling circuit 26 largely comprises the inverter circuit 35, a gate circuit 36, a control signal producing circuit 37 and an output circuit 38. The control signal producing circuit 37 is provided with two AND gates 39 and 40 and an inverter circuit 41, and the mode signal line 34 is coupled to respective first input nodes of the AND gates 39 and 40. The other input node of the AND gate 40 is directly coupled to the shifting signal line 42 where a shift control signal appears, and the shifting signal line 42 is further coupled to the inverter circuit 41 which in turn is coupled to the other input node of the AND gate 39. The gate circuit 36 is provided with a NAND gate 43 and a three-state buffer circuit 44 coupled in series, and the three-state buffer circuit 44 has an output node coupled to a data input/output line 45. The NAND gate 43 has one input node coupled to the port 23 through the output node 31, and the output node of the AND gate 39 is coupled in parallel to the other input node of the NAND gate 43 and a control node of the three-state buffer circuit 44. The output circuit 38 has a series combination f a p-channel type field effect transistor 46 and an n-channel type field effect transistor 47 coupled between a source of positive voltage 48 and a ground terminal, a NAND gate 49 provided in association with the p-channel type field effect transistor 46, a NOR gate 50 provided in association with the n-channel type field effect transistor 47, and an inverter circuit 51. The NAND gate 49 has two input nodes one of which is coupled to the output node of the AND gate 40 and the other of which is coupled to the data input/output line 45, and an output node of the NAND gate 49 is coupled to the gate electrode of the p-channel type field effect transistor 46. On the other hand, the NOR gate 50 has two input nodes one of which is coupled to the output node of the AND gate 40 through the inverter circuit 51 and the other o which is coupled to the data input/output line 45.

The system clock supplying circuit is operable in one of two different modes of operation, i.e., an internal oscillation mode or a transmission mode. When the mod selecting signal goes down to a low voltage level, the inverter circuit 35 produces a high voltage level which is supplied to the transmission gates 29 and 30. Then, the transmission gates 29 and 30 turn o to activate the feedback loop 24. With a small clock signal fed from the crystal resonator, an oscillation phenomenon take place in the feedback loop 24 to produce a raw system clock signal. The raw system clock signal is supplied to the inverter circuit 32 for waveshape, then a system clock signal is formed and supplied from the inverter circuit 32 to the system clock line 33. In this internal oscillation mode, the AND gates 39 and 40 of the control signal producing circuit 37 produce low voltage signals, respectively, so that the NAND gates 43 and 49 are shifted into respective disable states. The low voltage signal is inverted by the inverter circuit 51, so that a high voltage signal is supplied to the input node of the NOR gate 50. Then, the NOR gate is also shifted into a disable state. Thus, the NAND gate 43 remains in the disable state which results in that the data input/output line 45 is under no influence of the system clock supplying circuit. Similarly, both of the NAND gate 49 and the NOR gate 50 are in the respective disable states, so that the data input/output line 45 does not affect the port 23. In this internal oscillation mode, both of the ports 22 and 23 are used to provide a electrical path between the crystal resonator and the system clock supplying circuit. The three-state buffer circuit 44 is shifted into the high-impedance state under inactivation.

On the other hand, when the mode selecting signal goes up to the high voltage level, the low voltage level is supplied from the inverter circuit 35 to the transmission gates 29 and 30, so that the port 23 is electrically separated from the port 22. The system clock supplying circuit operates in the transmission mode, and a clock signal is supplied from the clock source 18 to the port 22. The clock signal is amplified by the amplifier circuit 27 and, then, shaped by the inverter circuit 32 to produce the system clock. In this transmission mode, only port 22 is used to receive the clock signal. This means that the port 23 is available for another purpose. In this instance, the port 23 is used as an input/output data port in the transmission mode of operation.

When the shift control signal goes up to the high voltage level, the AND gate 40 is shifted into an enable state, but the AND gate 39 remains in the disable state because the inversion of the shift control signal is applied thereto. When the AND gate 39 continues to supply the NAND gate 43 with the low voltage level, the NAND gate 43 remains in the disable state and is not responsive to the voltage level at the output node 31 of the shifting circuit 25. On the other hand, when the AND gate 40 supplies the NAND gate 49 and the inverter circuit 51 with the high voltage level, the NAND gate 49 is shifted into an enable state, and the inverter circuit 51 allows the NOR gate 50 to enter an enable state. In this circumference, if an output data signal of high voltage level is applied in parallel to the NAND gate 49 and the NOR gate 50, the n-channel type field effect transistor 47 turns on with the high voltage level from the NOR gate 50 but the p-channel type field effect transistor 46 remains in the off state with the high voltage level from the NAND gate 49. This results in that the n-channel type field effect transistor 47 provides a electrical path between the ground terminal and the port 23, thereby transmitting the output data signal of low voltage level to the port 23. On the other hand, the output data signal of high voltage level appears on the data input/output line 45, both of the NAND gate 49 and NOR gate 50 produce low voltage levels which are supplied to the p-channel type field effect transistor 46 and the n-channel type field effect transistor 47, respectively. Then, the p-channel type field effect transistor 46 turns on but the n-channel type field effect transistor 47 remains in the off state. A electrical path is established between the source of positive voltage 48 and the port 23, thereby transmitting the output data signal of high voltage level to the port 23. Thus, the control signal producing circuit 37 is responsive to the shift control signal and allows the port 23 to serve as the data output port.

On the other hand, when shift control signal goes down to the low voltage level, the AND gate 40 is shifted into the disable state, but the AND gate 39 is shifted into the enable state because the inversion of the shift control signal is applied thereto. When the AND gate 40 supplies the NAND gate 4 and the inverter circuit 51 with the low voltage level, the NAND gate 49 is shifted into the disable state, and the inverter circuit 51 allows the NOR gate 50 to enter the disable state. Then, the NAND gate 49 and the NOR gate 50 are not responsive to the output data signal. However, the AND gate 39 is shifted into an enable state with the inversion of the shift control signal. In this circumference, if an input data signal of high voltage level is applied to the port 23 which in turn is relayed to the output node of the shifting circuit 25, the NAND gate 43 produces the inverse of the input data signal which is supplied to the three state buffer circuit 44. With the high voltage level from the AND gate 39, the three-state buffer circuit 44 has been already activated, so that the inversion of the input data signal is relayed to the input/output data line 45. Thus, the control signal producing circuit 37 allows the port 23 to serve as the data input port.

Second Embodiment

Figure 3:
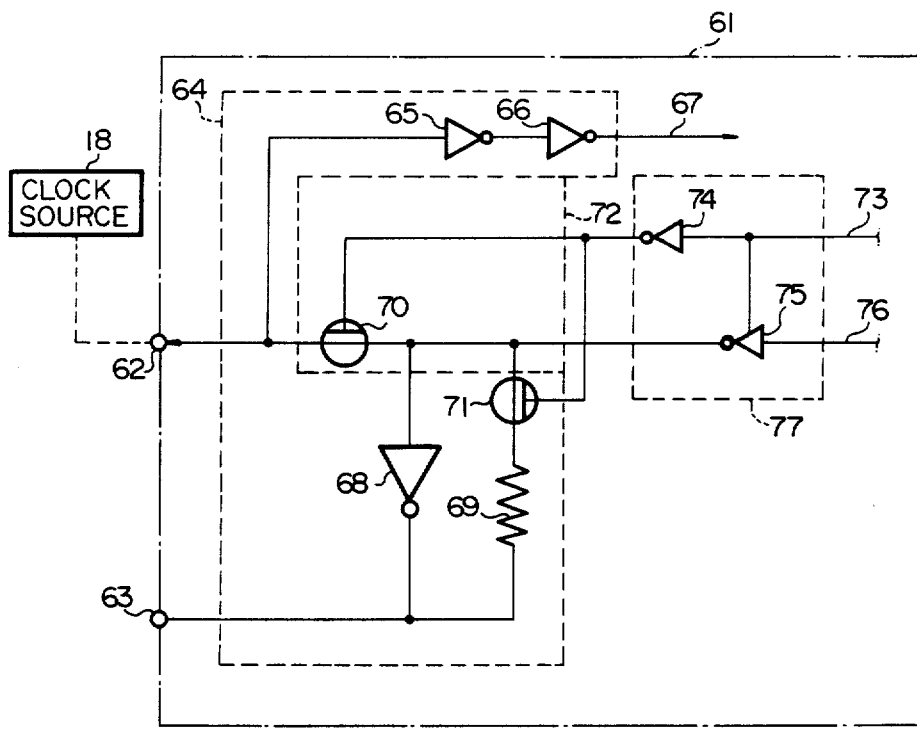
FIG. 3 is a diagram showing the circuit arrangement of another microprocessor embodying the present invention.

Turning to FIG. 3 of the drawings, another circuit arrangement is illustrated. The circuit arrangement is incorporated in a microcomputer 61 fabricated on a single semiconductor chip and accompanied by two ports 62 and 63. Though not shown in the drawings, the ports 62 and 63 are coupled to a crystal resonator or a ceramic resonator, but the port 62 is further coupled to a clock source 18. The ports 62 and 63 are coupled to a system clock supplying circuit 64 which comprises a series of two inverter circuits 65 and 66 coupled between the port 62 and a system clock line 67, an amplifier circuit 68 and a resistor 69 coupled in parallel between the ports 62 and 63. A transmission gate 70 is provided between the port 62 and the amplifier circuit 68, and a transmission gate 71 is provided between the transmission gate 70 and the resistor 69. The transmission gates 70 and 71 as a whole constitutes a shifting circuit 72. A mode signal line 73 is coupled to the input node of an inverter circuit 74, and the output node of the inverter circuit 74 is coupled in parallel to the respective gate electrodes of the n-channel type field effect transistors 70 and 71. The mode signal line 73 is further coupled to the control node of an three-state buffer circuit 75, and the input node of the three-state buffer circuit 75 is coupled to the data output line 76. The output node of the three-state buffer circuit 75 is coupled to the amplifier circuit 68. In this instance, the inverter circuit 74 and the three-state buffer circuit 75 as a whole constitute a port controlling circuit 77.

Description is hereinunder made for operations of the second embodiment. When a mode selecting signal of low voltage level is applied from the mode signal line 73 to the inverter circuit 74 and the three-state buffer circuit 75, the inverter circuit 74 produces the inverse signal of high voltage level which is supplied to the transmission gates 70 and 71. Then, transmission gates 70 and 71 turn on to establish electrical paths between the port 62 and the amplifier circuit 68 and the port 62 to the resistor 69. With a small clock fed from the crystal resonator, the system clock supplying circuit operates in the internal oscillation mode to produce a system clock which is supplied from the inverter circuit 66 to the system clock line 67. The three-state buffer circuit 75 is shifted into an inactive state or a high impedance state, so that an output data signal is blocked by the three-state buffer circuit 75.

On the other hand, if the mode selecting signal goes up to the high voltage level the inverter circuit 74 produces the inverse signal of the low voltage level which is supplied to the transmission gates 70 and 71. Then, the transmission gates turn off to block the electrical paths between the port 62 and the amplifier circuit 68 and the port 62 and the resistor 69, respectively. In this circumference, the system clock supplying circuit 64 operates in the transmission mode, and a clock signal applied from the clock source 18 to the port 62 is merely supplied to the inverter circuit 65. However, the three-state buffer circuit 75 is activated with the mode selecting signal of the high voltage level, so that the output data signal passes through the three-state buffer circuit 75 and is supplied to the amplifier circuit 68. After amplification, the output data signal is supplied to the port 63, then the port 63 serves as the data output port.

The port 63 is used as the data output port in the transmission mode of operation, however the port 63 is available as an data input port if the amplifier circuit 68 and the three-state buffer circuit 75 is coupled in inverted arrangement.

Third Embodiment

Figure 4:
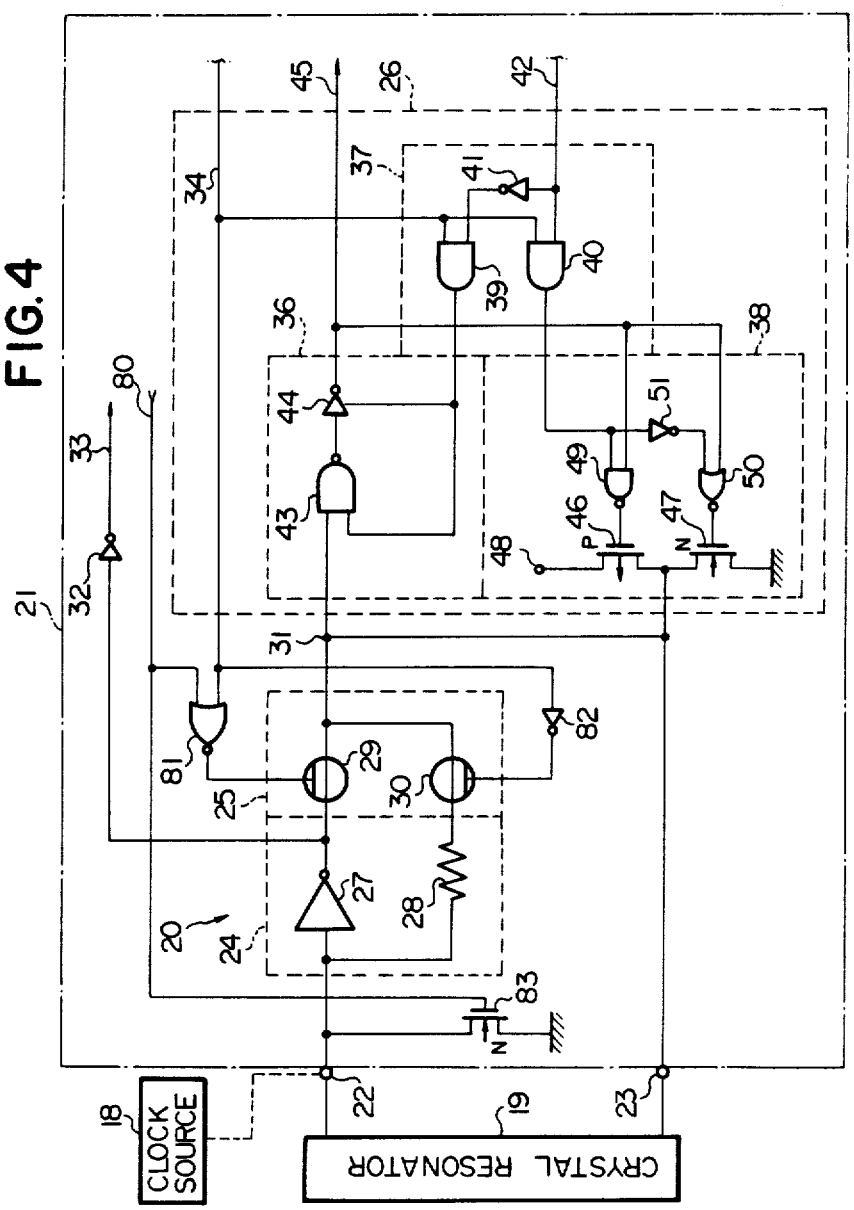
FIG. 4 is a diagram showing the circuit arrangement of still another microprocessor embodying the present invention.

Turning to FIG. 4 of the drawings, there is illustrated a system clock supplying circuit incorporated in a microprocessor 21 fabricated on a single semiconductor chip. The microprocessor 21 has a complicate circuit arrangement for data processing and a plurality of ports including two ports 22 and 23, however FIG. 4 merely shows a system clock supplying circuit 20 with a feedback loop 24, a shifting circuit 25 and a port controlling circuit 26 to which the present invention mainly appertains. The ports 22 and 23 are coupled to a crystal resonator 19 or a ceramic resonator. The port 22 is further capable of coupling to a clock source 18.

The feedback loop 24 is provided with an amplifier circuit 27 and a resistor 28 arranged in parallel, and the amplifier circuit 27 and the resistor 28 have respective input nodes coupled to the port 22. The shifting circuit 25 has two transmission gates 29 and 30 provided in parallel to each other, and the transmission gates 29 and 30 are coupled at one ends thereof to respective output nodes of the amplifier circuit 27 and the resistor 28, respectively. Each of the transmission gates 29 and 30 is provided with an n-channel type field effect transistor and a p-channel type field effect transistor coupled in parallel. However, the transmission gates 29 and 30 are coupled at the other ends thereof to an output node 31 of the shifting circuit 25, and the output node 31 of the shifting circuit 25 is coupled to the port 23. The output node of the feedback loop 24 is coupled to the inverter circuit 32 used for waveshape which in turn is coupled to a system clock line 33. The inverter circuit forms part of the system clock supplying circuit 20. The shifting circuit 25 is associated with a two-input NOR gate 81, and one of the two input nodes of the NOR gate 81 is coupled to a mode signal line 34 where a mode selecting signal appears, and the output node of the NOR gate 81 is coupled to the transmission gate 29. The mode signal line 34 s further coupled to an inverter circuit 82 which in turn is coupled to the transmission gate 30. The other input node of the NOR gate 81 is coupled to a interrupt signal line 80, and the interrupt signal line 80 is supplied with an interrupt signal of high voltage level when a HALT instruction is executed. The interrupt signal line 80 is further coupled to a gate electrode of an n-channel type field effect transistor 83 which is coupled between the port 22 and a ground terminal.

The port controlling circuit 26 largely comprises the inverter circuit 35, a gate circuit 36, a control signal producing circuit 37 and an output circuit 38. The control signal producing circuit 37 is provided with two AND gates 39 and 40 and an inverter circuit 41, and the mode signal line 34 is coupled to respective first input nodes of the AND gates 39 and 40. The other input node of the AND gate 40 is directly coupled to the shifting signal line 42 where a shift control signal appears, and the shifting signal line 42 is further coupled to the inverter circuit 41 which in turn is coupled to the other input node of the AND gate 39. The gate circuit 36 is provided with a NAND gate 4 and a three-state buffer circuit 44 coupled in series, and the three-state buffer circuit 44 has an output node coupled to a data input/output line 45. The NAND gate 43 has one input node coupled to the port 23 through the output node 31, and the output node of the AND gate 39 is coupled in parallel to the other input node of the NAND gate 43 and a control node of the three-state buffer circuit 44. The output circuit 38 has a series combination of a p-channel type field effect transistor 46 and an n-channel type field effect transistor 47 coupled between a source of positive voltage 48 and a ground terminal, a NAND gate 49 provided in association with the p-channel type field effect transistor 46, a NOR gate 50 provided in association with the n-channel type field effect transistor 47, and an inverter circuit 51. The NAND gate 49 has two input nodes one of which is coupled to the output node of the AND gate 40 and the other of which is coupled to the data input/output line 45, and an output node of the NAND gate 49 is coupled to the gate electrode of the p-channel type field effect transistor 46 On the other hand, the NOR gate 50 has two input nodes one of which is coupled to the output node of the AND gate 40 through the inverter circuit 51 and the other of which is coupled to the data input/output line 45.

The circuit arrangement illustrated in FIG. 4 is similar in operation to that shown in FIG. 2 in the absence of the interrupt signal, so that no description is incorporated for the to modes of operation. When the HALT instruction is executed in the internal oscillation mode, the interrupt signal of high voltage level appears on the interrupt signal line 80, so that the transmission gate 29 turns off to block the electrical path in the feedback loop 24. This results in that no oscillation phenomena takes place. Moreover, the n-channel type field effect transistor 83 turns on with the interrupt signal of high voltage level, so that the port 22 is clamped to the ground level.

Similarly, when the HALT instruction is executed during the transmission mode of operation, the interrupt signal of high voltage level is supplied to the interrupt signal line 80, so that the n-channel type field effect transistor 83 also turns on. Then the clock signal fed from the clock source 18 is not transferred to the system clock line 33.

Although particular embodiment of the present invention have been shown and described, it will be obvious to those skilled in the art that various changes and modifications may be made without departing from the spirit and scope of the present invention.

What is claimed is:

1. A data processing unit provided with at least first and second ports and fabricated on a single semiconductor chip, said first and second ports being coupled to an external resonance element in an internal oscillation mode, said first port being supplied with an external clock signal in a transmission mode, comprising:
    (a) system clock supplying means having two input nodes coupled to said first and second ports, respectively, and an output node coupled to a system clock line, said system clock supplying means being operative in one of said internal oscillation mode and said transmission mode;
    (b) a port controlling circuit responsive to a mode selecting signal and operative to produce a mode control signal representative of said internal oscillation mode or said transmission mode;
    (c) a data signal propagation line coupled to said port controlling circuit for propagating a data bit; and
    (d) a switching circuit responsive to said mode control signal representative of said internal oscillation mode to allow said system clock supplying means to produce a system clock in cooperation with said external resonance element coupled to said first and second ports, said system clock being supplied to said system clock line said switching circuit further being responsive to said mode control signal representative of said transmission mode to allow said system clock supplying means to transmit said external clock signal appearing at said first port to said system clock line, said switching circuit further providing an electrical path for said data bit between said data signal propagation line and said second port in response to said mode control signal representative of said transmission mode.

2. A data processing unit as set forth in claim 1, in which said system clock supplying means comprises an amplifier circuit and a resistor arranged in parallel and coupled at one ends thereof to one of said ports, and a wave-shaping circuit coupled between the other end of said amplifier circuit and said system clock line.

3. A data processing unit as set forth in claim 2, in which said wave-shaping circuit is formed by an inverter circuit.

4. A data processing unit as set forth in claim 2, in which said shifting circuit comprises two transfer gates having respective control gates where said mode selecting signal is applied, said transfer gates being arranged in parallel and coupled at one ends to the other of said two ports and at the other ends thereof to said amplifier circuit and said resistor, respectively.

5. A data processing unit as set forth in claim 4, in which said port controlling circuit comprises a gate circuit coupled between said shifting circuit and said data propagation line, an output circuit coupled to the other of said two ports, and an internal shifting circuit activated by said mode selecting signal representative of said transmission mode, aid internal shifting circuit being responsive to a shift control signal and operative to activate one of said gate circuit and said output circuit.

6. A data processing unit as set forth in claim 5, in which said gate circuit comprises a series combination of a two-input first NAND gate and a three-state buffer circuit, one of said inputs of said first NAND gate being coupled to the other of said two ports.

7. A data processing unit as set forth in claim 6, in which said internal shifting circuit comprises a second two-input NAND gate, a third two-input NAND gate and a first inverter circuit, said mode selecting signal being supplied to one of the input nodes of said second NAND gate and one of the input nodes of said third NAND gate, said shift control signal being supplied to said first inverter circuit and the other input node of said third NAND gate, the output node of said first inverter circuit being coupled to the other input node of said second NAND gate, the output ode of said second NAND gate being coupled to the other input node of said first NAND gate.

8. A data processing unit as set forth in claim 7, in which said output circuit comprises a series combination of a p-channel type field effect transistor and an n-channel type field effect transistor coupled between a source of positive voltage and a ground terminal, a fourth two-input NAND gate, a two-input NOR gate and a second inverter circuit, the output node of said second NAND gate being coupled to one of the input nodes of said fourth NAND gate and the input node of said second inverter circuit, the output node of said second inverter circuit being coupled to one of the input nodes of said NOR gate, said data propagation line being coupled to the other input nodes of said fourth NAND gate and said NOR gate, the output nodes of said fourth NAND gate and said NOR gate being coupled in parallel to said p-channel type field effect transistor and said n-channel type field effect transistor.

9. A data processing unit as set forth in claim 1, in which said system clock supplying means comprises a series combination of two inverter circuits coupled between one of said ports and said system clock line, a amplifier circuit capable of providing a electrical path between one of said ports and the other of said ports, and a resistor capable of providing a electrical path between one of said ports and the other of said ports in parallel to said amplifier circuit.

10. A data processing unit as set forth in claim 9, in which said shifting circuit comprises a first transfer gate coupled between one of said ports and an input node of said amplifier circuit and a second transfer gate coupled between the input node of said amplifier circuit and said resistor.

* * * * *

UNITED STATES PATENT AND TRADEMARK OFFICE
CERTIFICATE OF CORRECTION

PATENT NO. : 4,910,703

DATED : March 20, 1990

INVENTOR(S) : Yukihiro Ikeda et al.

It is certified that error appears in the above-identified patent and that said Letters Patent is hereby corrected as shown below:

Col. 2, line 51, delete "pot" and insert --port--;

Col. 2, line 60, delete "a" and insert --at--;

Col. 3, line 23, delete "f" and insert --of--;

Col. 3, line 39, delete "o" and insert --of--;

Col. 3, line 43, delete "mod" and insert --mode--;

Col. 3, line 47, delete "o" and insert --on--;

Col. 4, line 63, delete "gate 4" and insert --gate 49--;

Col. 6, line 54, delete "s" and insert --is--;

Col. 8, line 66, delete "ode" and insert --node--.

Signed and Sealed this

Thirteenth Day of August, 1991

*Attest:*

HARRY F. MANBECK, JR.

*Attesting Officer*     *Commissioner of Patents and Trademarks*